Dec. 7, 1954    J. H. BARNES    2,696,409
TRIM MEMBER FOR AUTOMOBILE WHEEL ASSEMBLIES
Filed Oct. 9, 1953

INVENTOR.
JAMES H. BARNES
BY
McMorrow, Berman + Davidson
ATTORNEYS

United States Patent Office 2,696,409
Patented Dec. 7, 1954

2,696,409

TRIM MEMBER FOR AUTOMOBILE WHEEL ASSEMBLIES

James H. Barnes, Erwin, N. C.

Application October 9, 1953, Serial No. 385,171

4 Claims. (Cl. 301—37)

This invention relates to a trim member for attachment to an automobile wheel assembly.

In my Patent No. 2,621,979, there is disclosed and claimed a trim member for attachment to an automobile wheel assembly which comprises an annular body disposed in confronting relation with the side wall of a tire casing with a skirt disposed within the annular body and fixedly secured to the inner periphery thereof, the skirt being adapted for engagement between the tire casing and the rim of the wheel assembly and supported therein, and resilient means carried on the confronting face of the annular body for urging the latter into abutting and embracing relation with respect to the side wall of the tire casing.

Although the trim member of the aforementioned Patent No. 2,621,979 operates in a satisfactory manner, it has been found that the performance is improved by providing both the annular body and the skirt with means for dissipating the surface heat of the side wall portion of the tire casing covered by my trim member.

Therefore, it is an object of my present invention to provide conduit means for conducting heated air trapped between the trim member and the tire casing away from the side wall of the casing.

Other objects and advantages of the present invention will become apparent from a consideration of the following description and claims in conjunction with the drawing, wherein:

Figure 1:
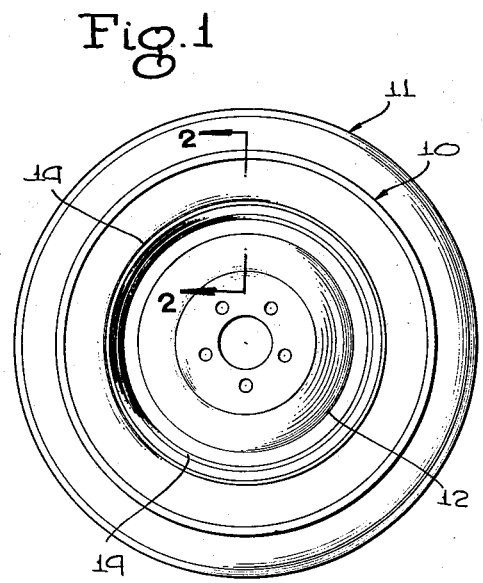
Figure 1 is an elevational view of an automobile wheel assembly with the trim member of the present invention attached thereto.
Figure 2:
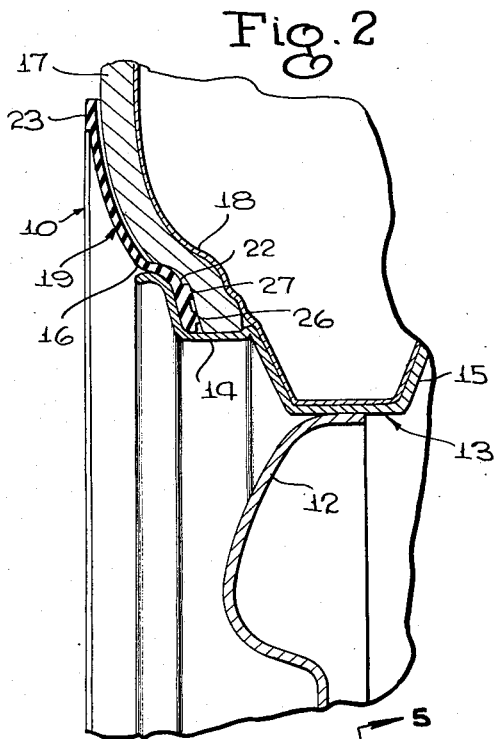
Figure 2 is an enlarged sectional view taken along line 2—2 of Figure 1.
Figure 3:
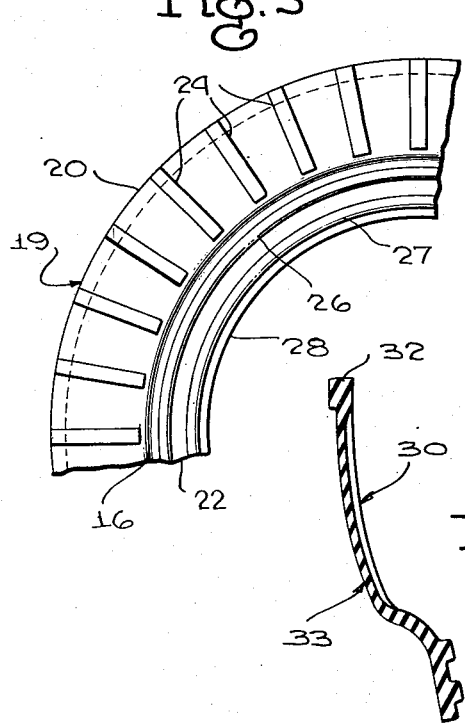
Figure 3 is an enlarged fragmentary view of the improved trim member showing the face of the trim member which is positioned adjacent a tire casing when the trim member is attached to an automobile wheel assembly.

Referring now in more detail to the Figures 1, 2 and 3 of the drawing in which like reference numerals are used throughout related views, the numeral 10 designates generally a trim member of the present invention which is attached to an automobile wheel assembly 11 of conventional design. The wheel assembly 11 comprises a central load-bearing plate 12 to which a tire rim 13 is fixedly secured. The rim 13 includes a pair of diverging annular flanges 14 and 15 which support a pneumatic tire casing 17 having an inner tube 18 disposed therein.

The trim member 10, which is fabricated of a suitable resilient material, such as hard rubber, comprises an annular body 19 arcuately shaped to conform to the side wall 21 of the tire casing 17. Depending from the inner peripheral edge 16 of the annular body 19 is a skirt 22 which is adapted to be inserted between the tire rim 13 and the adjacent portion of the tire casing 17. A bead 23 extends along the outer peripheral edge 20 of the body 19 and is secured thereto.

Spaced circumferentially about the face of the annular body 19 adjacent the tire casing 17 is a plurality of conduits or grooves 24 which extend radially from the inner edge 16 to the outer peripheral edge 20 of the annular body 19 where they are vented to the atmosphere. A pair of annular ribs 26 and 27 project from the face of the skirt 22 adjacent the tire casing 17 and are arranged in spaced concentric relation; the ribs 26 and 27 being spaced from the inner peripheral edge 28 of the annular skirt 22.

Figure 4:
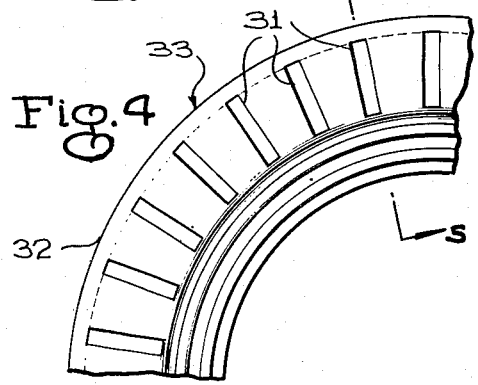
Figure 4 is a fragmentary view of a modified form of the present invention showing the face of the trim member which is positioned adjacent a tire casing when the trim member is attached to an automobile wheel assembly.
Figure 5:
Figure 5 is an enlarged sectional view taken along line 5—5 of Figure 4.

Referring now to Figures 4 and 5, the numeral 30 indicates generally a modified form of the trim member. The modified trim member 30 differs from the trim member 10 in that the radially extending grooves 31 terminate at a point spaced from the outer peripheral edge 32 of the annular body 33.

In use of the form shown in Figures 1, 2 and 3, the trim member 10 traps air between the skirt 22 and the tire casing 17 and in the grooves 24 when the member 10 is mounted on the wheel assembly 11. As the wheel assembly revolves and the tire casing becomes heated, the trapped air in the grooves 24 escapes to the atmosphere from the open ends of the grooves. Further, the heated air trapped between the skirt and the tire casing passes into the adjacent grooves for escape to the atmosphere when the road-engaging portion of the tire flexes and distorts the adjacent portion of the resilient trim member.

By thus circulating the air in contact with the tire casing 17, the surface heat of the casing is dissipated and overheating of the tire casing is avoided.

In use of the modified form of Figures 4 and 5, air escapes to the atmosphere from the grooves 31 and from between the skirt and tire casing when the tire flexes and the outer peripheral edge 32 of the annular body is moved away from the side wall of the tire casing.

What is claimed is:

1. In a trim member for attachment to an automobile wheel assembly including a rim and a tire casing mounted on said rim, said trim member being fabricated of a resilient material and comprising an annular body disposed in confronting relation with the outer side wall of said tire casing, and a skirt disposed within said annular body and secured to the inner periphery thereof, said skirt being adapted for engagement between said tire casing and said rim and supported therebetween, the improvement consisting in providing said annular body with a plurality of spaced radially extending conduit means and said skirt with an annular conduit means.

2. In a trim member for attachment to an automobile wheel assembly including a rim and a tire casing mounted on said rim, said trim member being fabricated of a resilient material and comprising an annular body disposed in confronting relation with the outer side wall of said tire casing, and a skirt disposed within said annular body and secured to the inner periphery thereof, said skirt being adapted for engagement between said tire casing and said rim and supported therebetween, the improvement consisting in providing said annular body with a plurality of spaced radially extending conduit means and said skirt with an annular conduit means, each of said radially extending conduit means being in communication with the space between said annular body and said side wall of the tire casing.

3. In a trim member for attachment to an automobile wheel assembly including a rim and a tire casing mounted on said rim, said trim member being fabricated of a resilient material and comprising an annular body disposed in confronting relation with the outer side wall of said tire casing, and a skirt disposed within said annular body and secured to the inner periphery thereof, said skirt being adapted for engagement between said tire casing and said rim and supported therebetween, the improvement consisting in providing said annular body with a plurality of spaced radially extending grooves on its surface confronting said side wall of said casing and said skirt with an annular groove on its surface adjacent said tire casing.

4. In a trim member for attachment to an automobile wheel assembly including a rim and a tire casing mounted on said rim, said trim member being fabricated of a resilient material and comprising an annular body disposed in confronting relation with the outer side wall of said tire casing, and a skirt disposed within said annular body and secured to the inner periphery thereof, said skirt being adapted for engagement between said tire casing and said rim and supported therebetween, the improvement consisting in providing said annular body with a plurality of spaced radially extending grooves on its surface confronting said side wall of said tire casing, and at least a pair of spaced concentrically arranged annular ribs projecting from the surface of said skirt adjacent said tire casing.

References Cited in the file of this patent

UNITED STATES PATENTS

| Number | Name | Date |
|---|---|---|
| 2,146,942 | Czerwin | Feb. 14, 1939 |
| 2,334,388 | Daniel | Nov. 16, 1943 |
| 2,621,979 | Barnes | Dec. 16, 1952 |